(12) United States Patent
Dalla Piazza et al.

(10) Patent No.: US 7,503,212 B2
(45) Date of Patent: Mar. 17, 2009

(54) ADJUSTABLE MEASURING SCOOP

(75) Inventors: Enrico Dalla Piazza, Schneisingen (CH); Edward H. Kilduff, New York, NY (US); Chi Ming Tse, Kwai Chung (HK); Dean B. Chapman, New York, NY (US); Gareth Brown, Brooklyn, NY (US)

(73) Assignee: Dalla Piazza & Co., Schneisingen (CH)

( * ) Notice: Subject to any disclaimer, the term of this patent is extended or adjusted under 35 U.S.C. 154(b) by 303 days.

(21) Appl. No.: 11/188,949

(22) Filed: Jul. 25, 2005

(65) Prior Publication Data

US 2005/0252291 A1 Nov. 17, 2005

Related U.S. Application Data

(63) Continuation-in-part of application No. 11/040,416, filed on Jan. 21, 2005, now Pat. No. 7,086,282, which is a continuation-in-part of application No. 10/765,294, filed on Jan. 27, 2004, now Pat. No. 7,100,443.

(51) Int. Cl.
*G01F 19/00* (2006.01)

(52) U.S. Cl. .................................................. 73/429

(58) Field of Classification Search .................. 73/426, 73/429
See application file for complete search history.

(56) References Cited

U.S. PATENT DOCUMENTS

| | | | | |
|---|---|---|---|---|
| 837,506 A * | 12/1906 | Raney | ........................ | 30/326 |
| 2,313,213 A | 3/1943 | Atherley | ...................... | 73/165 |
| 2,630,014 A | 3/1953 | Chester | ........................ | 73/429 |
| 2,664,753 A | 1/1954 | Hein | ............................. | 73/429 |
| 2,747,410 A * | 5/1956 | Dubin | .......................... | 73/429 |
| 2,839,928 A | 6/1958 | Fohrman | ..................... | 73/429 |
| 3,416,375 A | 12/1968 | Lubman et al. | ................ | 73/429 |
| 3,421,236 A * | 1/1969 | Moyer | .......................... | 37/409 |
| 4,392,806 A * | 7/1983 | Houle | .......................... | 425/286 |
| 4,616,867 A | 10/1986 | O'Hara | ......................... | 294/55 |
| 4,961,521 A | 10/1990 | Eckman | ................... | 222/142.5 |
| 5,137,316 A * | 8/1992 | Foos | ............................. | 294/55 |
| 5,182,948 A | 2/1993 | Robbins et al. | ................ | 73/429 |
| 5,325,717 A | 7/1994 | Robbins et al. | ................ | 73/429 |
| 5,377,879 A * | 1/1995 | Isaacs | ......................... | 222/205 |
| 5,448,913 A | 9/1995 | Robbins et al. | ................ | 73/429 |
| 5,460,042 A | 10/1995 | Tucker | ......................... | 73/429 |
| D368,864 S | 4/1996 | Weterrings | ................ | D10/46.3 |
| D370,421 S | 6/1996 | Tucker | ...................... | D10/46.3 |
| D371,976 S | 7/1996 | Tucker | ...................... | D10/46.3 |

(Continued)

FOREIGN PATENT DOCUMENTS

EP 1048252 11/2000

*Primary Examiner*—Robert R Raevis
(74) *Attorney, Agent, or Firm*—Law Offices of Thomas J. Brindisi

(57) ABSTRACT

An adjustable measuring scoop including a partition that is movable so as to result in a scoop size that can be selectively determined between a maximum and a minimum by ready manual manipulation of the scoop. Part of the perimeter of the movable partition may include a lip (which may further include a flange and/or a seal) that is preferably configured and formed of suitable materials so as to permit for the containment of fine powders, liquids, etc. The movable partition may also include a depression formed on its upper surface for the convenient temporary holding of materials.

20 Claims, 15 Drawing Sheets

U.S. PATENT DOCUMENTS

| | | | |
|---|---|---|---|
| D374,181 S | 10/1996 | Weterrings | D10/46.3 |
| D377,615 S | 1/1997 | Weterrings | D10/46.2 |
| 5,647,413 A * | 7/1997 | Horrell | 141/108 |
| 5,678,450 A | 10/1997 | Robbins et al. | 73/429 |
| D388,717 S | 1/1998 | Wetterings | D10/46.3 |
| D388,718 S | 1/1998 | Weterrings | D10/46.3 |
| 6,125,699 A | 10/2000 | Molenaar | 73/429 |
| D451,829 S | 12/2001 | McGuyer | D10/46.3 |
| 6,470,745 B1 * | 10/2002 | Reay et al. | 73/426 |
| 7,086,282 B2 * | 8/2006 | Kilduff et al. | 73/429 |
| 7,100,443 B2 * | 9/2006 | Kilduff et al. | 73/429 |
| 2003/0011203 A1 * | 1/2003 | Rincon Uribe | 294/1.4 |

* cited by examiner

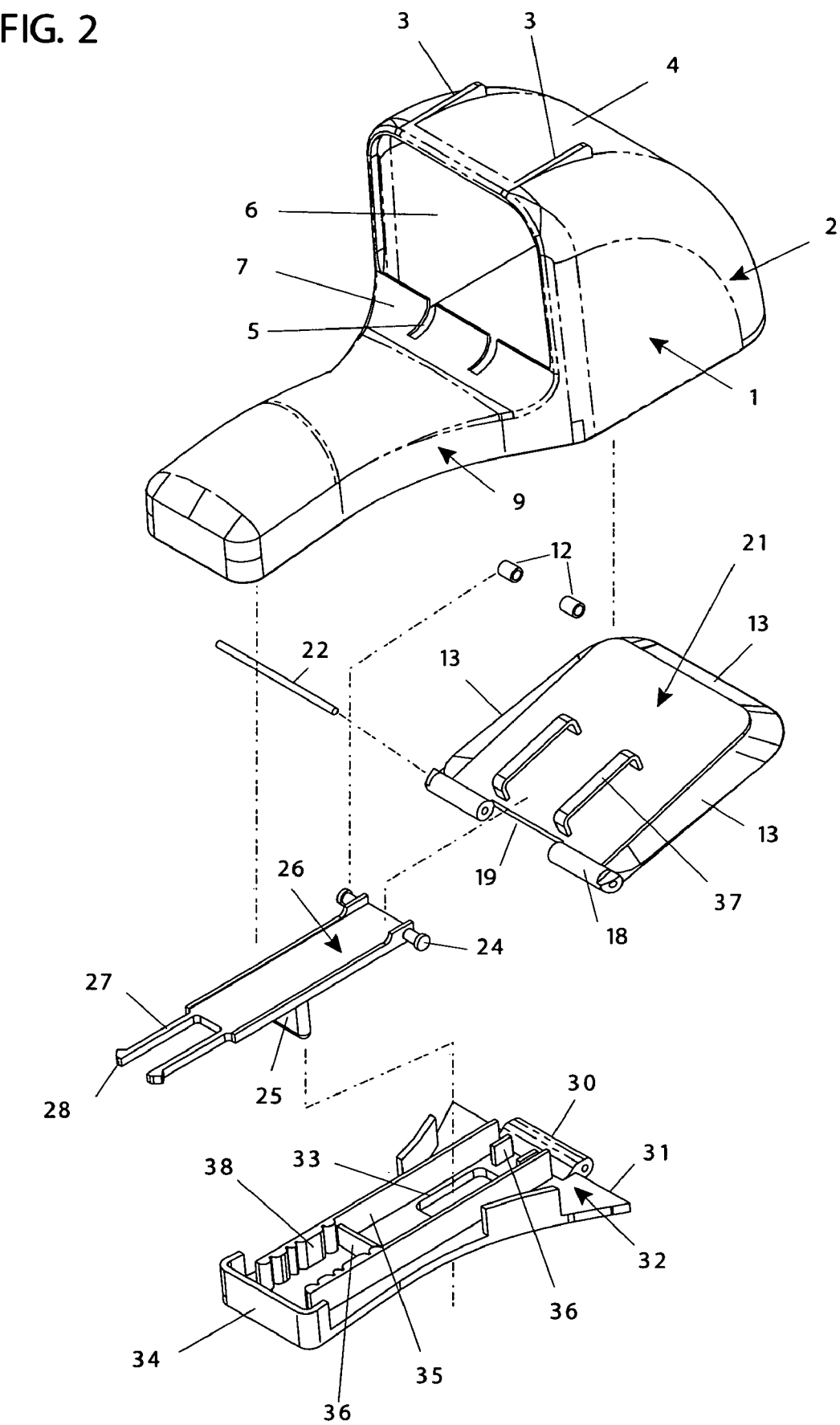

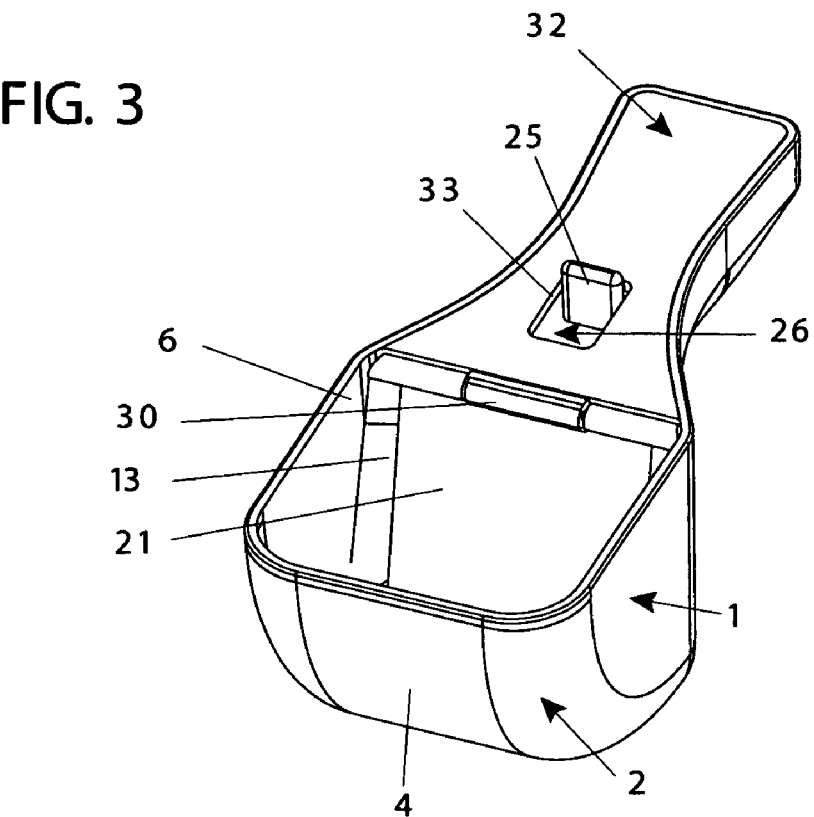
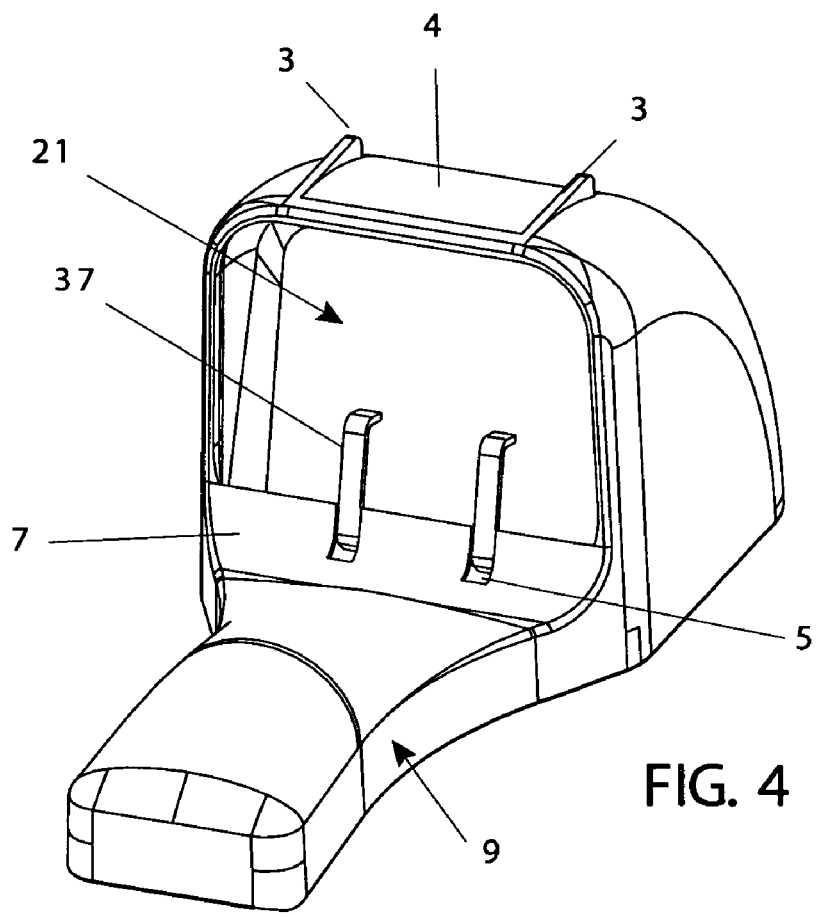

FIG. 18
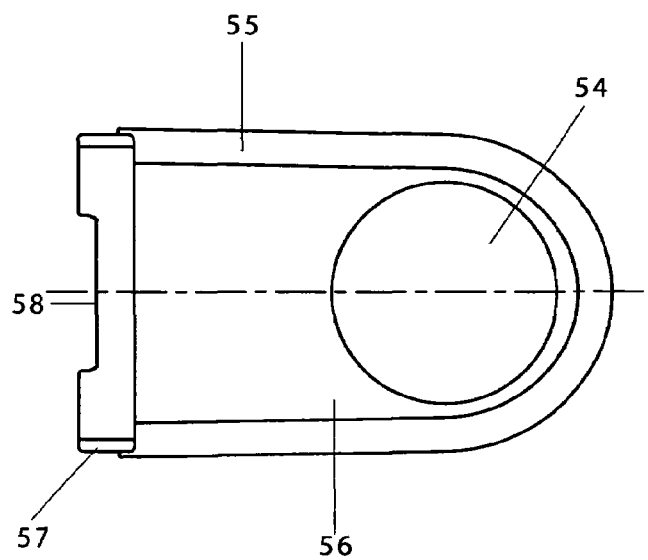
FIG. 19
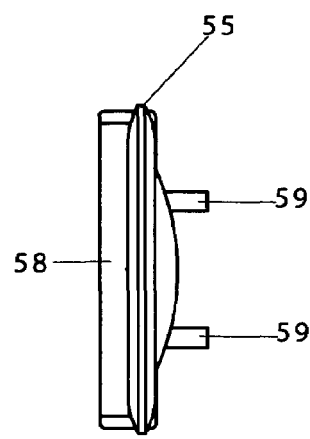
FIG. 20
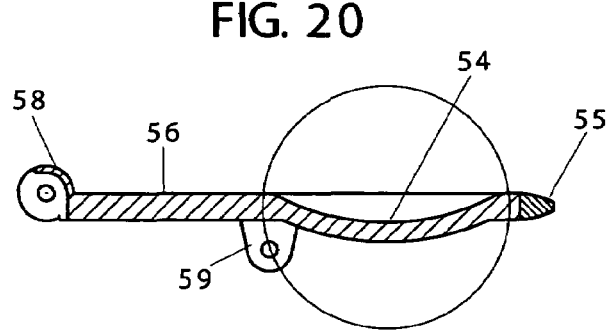
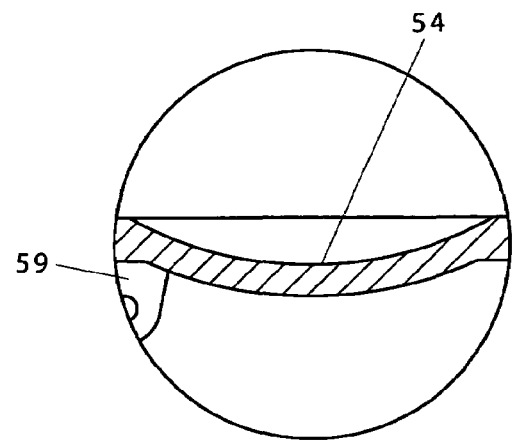
FIG. 21
FIG. 22
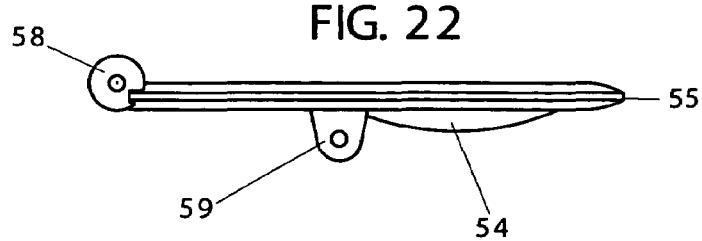

US 7,503,212 B2

ADJUSTABLE MEASURING SCOOP

RELATED APPLICATION

This application is a continuation-in-part of U.S. patent application Ser. No. 11/040,416 entitled "Adjustable Measuring Scoop" and filed on Jan. 21, 2005, now U.S. Pat. No.7, 086,282 which is in turn a continuation-in-part of U.S. patent application Ser. No. 10/765,294 entitled "Adjustable Measuring Scoop" and filed on Jan. 27, 2004 now U.S. Pat. No. 7,100,443.

FIELD OF THE INVENTION

The present invention generally relates to the field of measuring devices, and more particularly to a measuring scoop that can be adjusted to measure various specific amounts of materials such as cooking ingredients.

BACKGROUND OF THE INVENTION

Adjustable measuring devices exist, but with one or more drawbacks. U.S. Pat. No. 5,678,450 to Robbins et al. discloses an adjustable measurement container in which the size of the scoop is adjusted by linearly sliding a sliding member that includes a covering portion (unnumbered) and a partition (dam 42). U.S. Pat. No. 6,125,699 to Molenaar discloses an adjustable measuring spoon in which the size of the scoop is adjusted by rotating a pivoting member that also includes a covering portion (gate 23) and a partition (49). Neither patent, however, discloses an intimate, hermetically-sealing relationship between the moving parts or suggests how the devices could be modified to attain that.

SUMMARY OF THE INVENTION

An adjustable measuring scoop including a partition that is movable so as to result in a scoop size that can be selectively determined between a maximum and a minimum by ready manual manipulation of the scoop. Part of the perimeter of the movable partition may include a lip, which may in turn include a flange and/or seal, and which is preferably configured and formed of suitable materials so as to permit for the containment of fine powders, liquids, etc. The movable partition may also include a depression formed on its upper surface for the convenient temporary holding of materials.

BRIEF DESCRIPTION OF THE DRAWINGS

FIGS. 1-6 are views of a first embodiment of an adjustable measuring scoop according to the present invention, wherein:

FIG. 1 is an exploded top perspective view;

FIG. 2 is an exploded bottom perspective view;

FIGS. 3 and 4 are top and bottom perspective views, respectively, showing the movable partition in a first open position; and, FIGS. 5 and 6 are top and bottom perspective views, respectively, showing the movable partition in a second open position.

FIGS. 7-16 are views of a second embodiment of an adjustable measuring scoop according to the present invention, wherein:

FIG. 7 is a top view;

FIG. 8 is a side sectional view;

FIG. 9 is a rear view;

FIG. 10 is an exploded top perspective view;

FIG. 11 is an exploded side sectional view;

FIG. 12 is a side sectional view of this embodiment's movable partition;

FIG. 13 is a bottom view of the movable partition of FIG. 12;

FIG. 14 is a partial, magnified side sectional view of the circled portion of the movable partition of FIG. 12;

FIG. 15 is front sectional view of the movable partition of FIG. 12; and,

FIG. 16 is a top view of the movable partition of FIG. 12.

FIGS. 17-23 are views of a third embodiment of an adjustable measuring scoop according to the present invention, wherein:

FIG. 17 is an exploded top perspective view;

FIG. 18 is a top view of this embodiment's movable partition;

FIG. 19 is a front view of the movable partition of FIG. 18;

FIG. 20 is a side sectional view of the movable partition;

FIG. 21 is a partial, magnified side sectional view of the circled portion of the movable partition of FIG. 20;

FIG. 22 is side view of the movable partition; and,

FIG. 23 is a top perspective view of the movable partition.

FIGS. 24-29 are views of a fourth embodiment of an adjustable measuring scoop according to the present invention, wherein:

FIGS. 24 and 25 are exploded top perspective views;

FIG. 26 is a top perspective view; and,

FIGS. 27-29 are a sequence of side sectional views showing movement of the bucket and integral partition/handle with respect to each other.

DETAILED DESCRIPTION OF A PREFERRED EMBODIMENT

Figure 1:
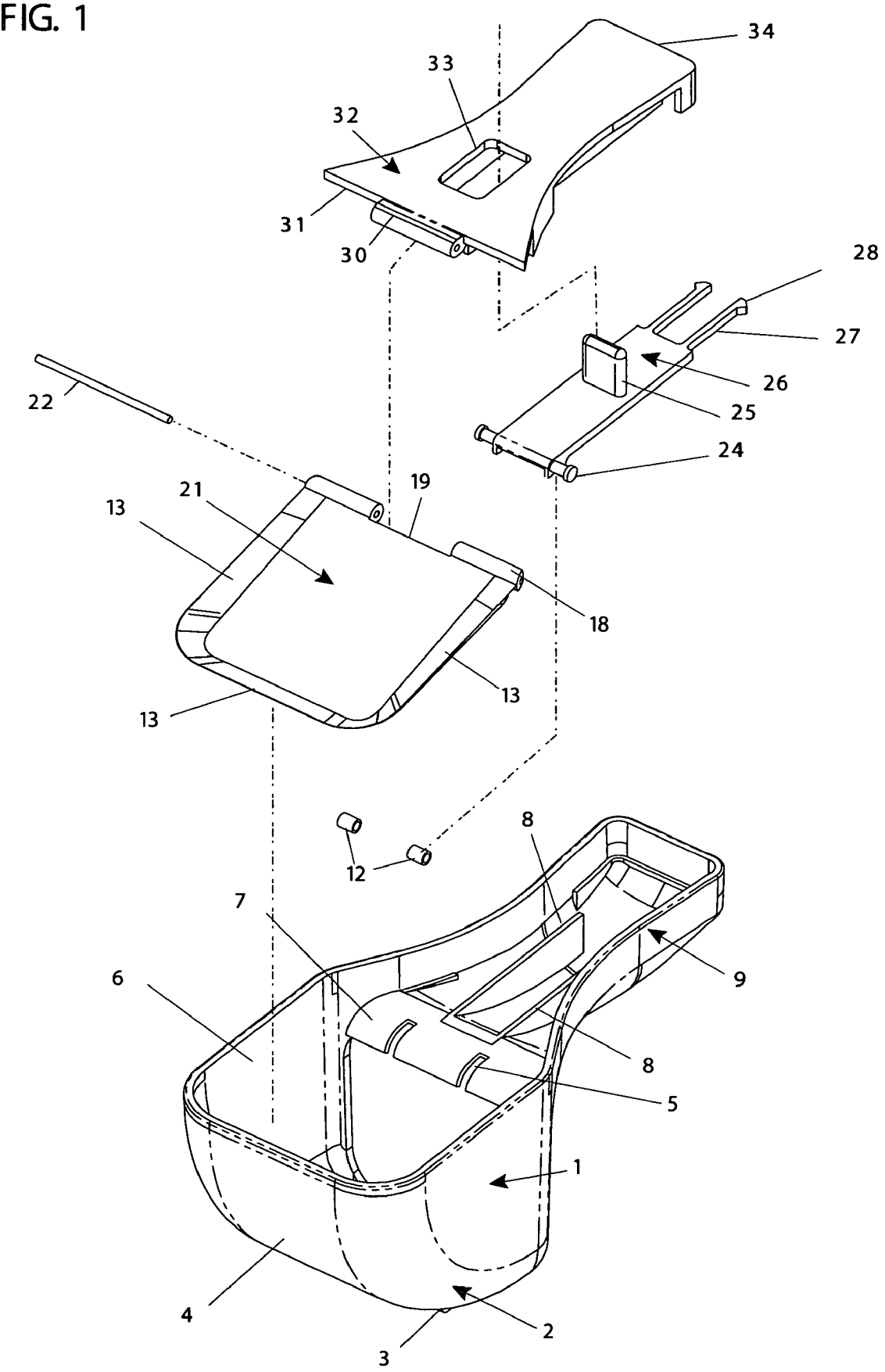
Figure 5:
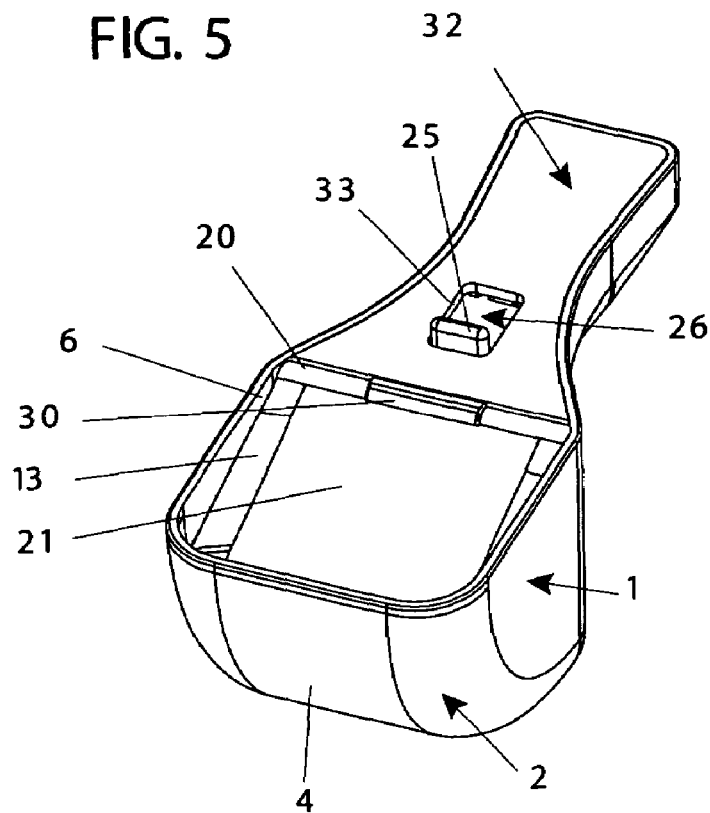
Figure 6:
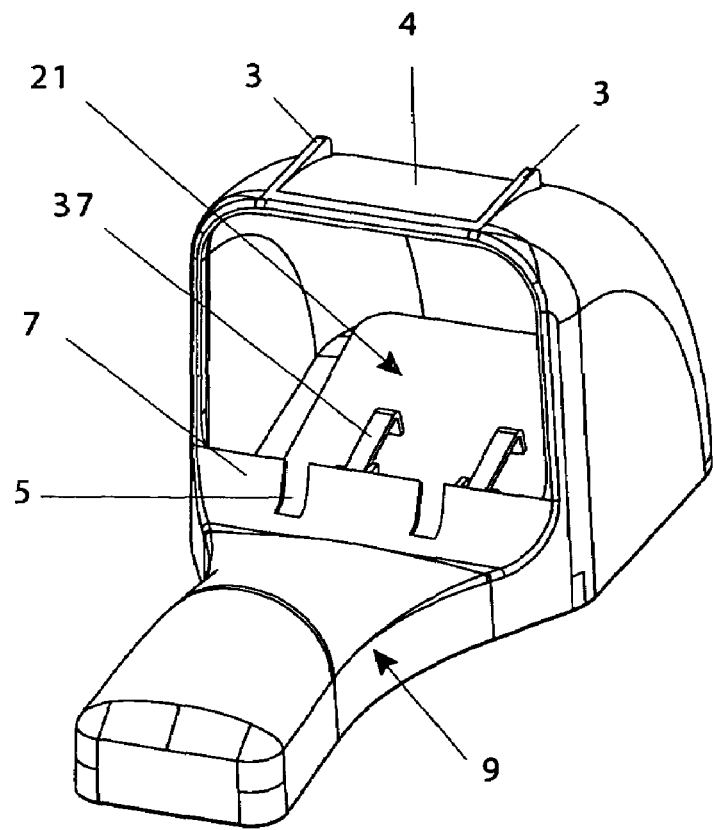

A first preferred embodiment of an adjustable measuring scoop according to the invention is shown in FIGS. 1-6. Scoop 1 is a utensil preferably used for measurement of quantities of materials such as cooking ingredients or any other suitable items. The capacity of scoop 1 is adjustable to allow measurement of a range of quantities of materials. Scoop 1 is preferably made predominantly of molded plastic although other materials such as metal or aluminum can be used.

Scoop 1 generally comprises a bucket 2, an ergonomically shaped handle 9, and a movable partition 21. The walls of the bucket 2 comprise a front/bottom portion 4 and side portions 6, with pedestals 3 provided at the bottom of front/bottom portion 4 to permit the scoop to be rested on a suitable flat surface. The handle 9 also includes a finger rest 7 provided with two guide slots 5, and the movable partition 21 includes a lip 13 along its perimeter that snugly contacts the interior of the walls of bucket 2.

The movable partition 21 is rotatably connected to a handle insert 32 on an axle 22 (preferably made of a suitable metal) within partition axle boxes 18 (which rest on abutments 31 of handle insert 32) and a body axle box 30 (which fits within the space 19 between the partition axle boxes). The handle insert 32 also includes mating extensions 34 to snugly secure it within the handle 9 of the scoop's body. A slide 26 is linearly slidingly secured between handle insert 32 and the body of the handle 9 of scoop 1, and is restricted to a linear path by the following elements: on its top, by top supports 36 formed in the handle insert 32; on its bottom by bottom supports 8; and, laterally, by side supports 35 within which the slide 26 is laterally confined.

The slide 26 slides in response to a force applied forward or backward by a user's finger (preferably thumb) on the portion of trigger 25 protruding through aperture 33. Forward movement of the slide 26 forces the slide "T" 24 against the rear of the movable partition 21, causing the partition 21 to swing upwardly toward the opening of the bucket 2 of the scoop 1. Conversely, backward movement of the slide 26 pulls the slide "T" 24 against guides 37, causing the partition 21 to swing downwardly away from the opening of the bucket 2. These movements are also facilitated by bushings 12 fitted on the ends of the slide "T" 24 (which may include a metal component for durability) and run within the guides 37. To facilitate temporary securing of a desired position for the movable partition 21 within the bucket 2, the slide 26 is provided with locking extensions 27 having ribs 28 that mate with corresponding locking grooves 38 formed into the handle insert 32. The locking grooves 38 preferably include a number of positions associated with specific corresponding adjusted sizes of bucket 2, and are dimensioned and configured together with the locking extensions 27 and ribs 28 to permit ribs 28 to engage any of the locking grooves 38 securely enough to permit handling and transportation of the scoop 1 (without inadvertent movement of the movable partition 21) while a load of material is in bucket 2 without the need for constant manual securing of any parts, while still permitting the ribs 28 to pass between the locking grooves 38 upon application of a reasonable manual force on the trigger 25. As will be readily apparent to one of ordinary skill in the art, the handle insert 32 may also have reference indicia (not shown) aligned with the trigger 25 in conjunction with which the selected size of the bucket 2 is visually indicated to the user. The bucket 2 may also have reference indicia (not shown).

As shown in the sequence of FIGS. 3-4 and 5-6, manual adjustment of the trigger 25 back and forth causes the movable partition 21 to rotate back and forth on axle 22, with its lip 13 snugly sliding along the complementary interior surface of the fixed walls of the bucket 2. The curvature of the walls' front/bottom portion 4 is substantially defined by a portion of a cylinder of rotation about the axle 22, such that the partition 21 can swing along the interior of the bucket 2 with a snug sliding fit that prevents material being measured from moving past the partition 21 and entering the unused space on the side of the partition 21 opposite the opening of the bucket 2. To facilitate a reliable snug sliding fit, the scoop 1 is preferably made of a durable and high strength plastic that will not deform under normal operating temperatures and conditions, such as injection molded polycarbonate or ABS plastic. Alternately, it could be formed substantially of stainless steel, or chrome-plated die-cast zinc.

Figure 7:
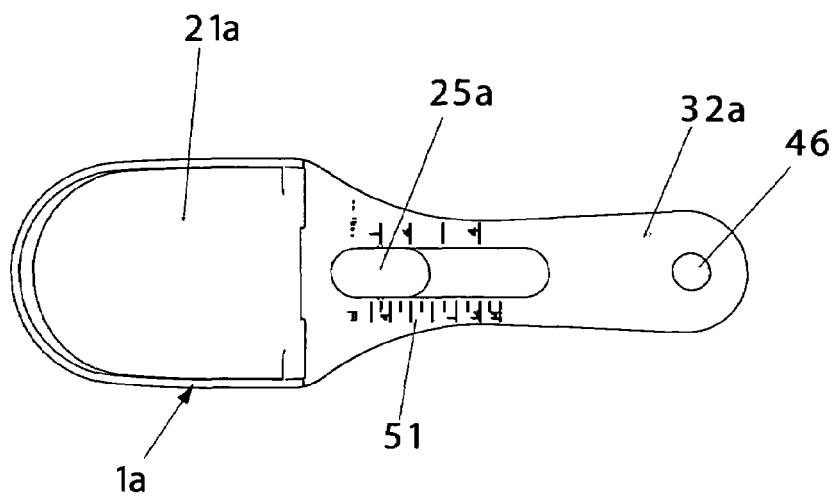
Figure 8:
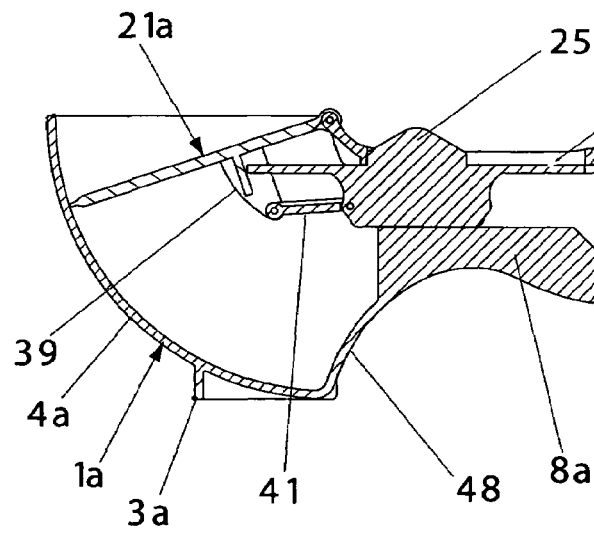
Figure 9:
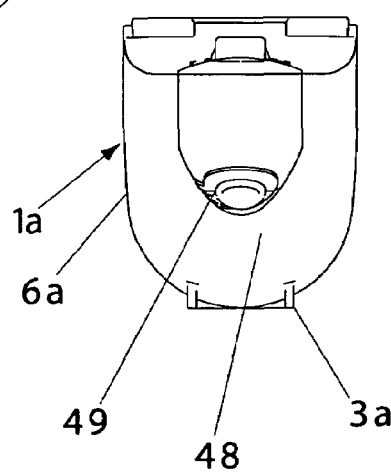
Figure 10:
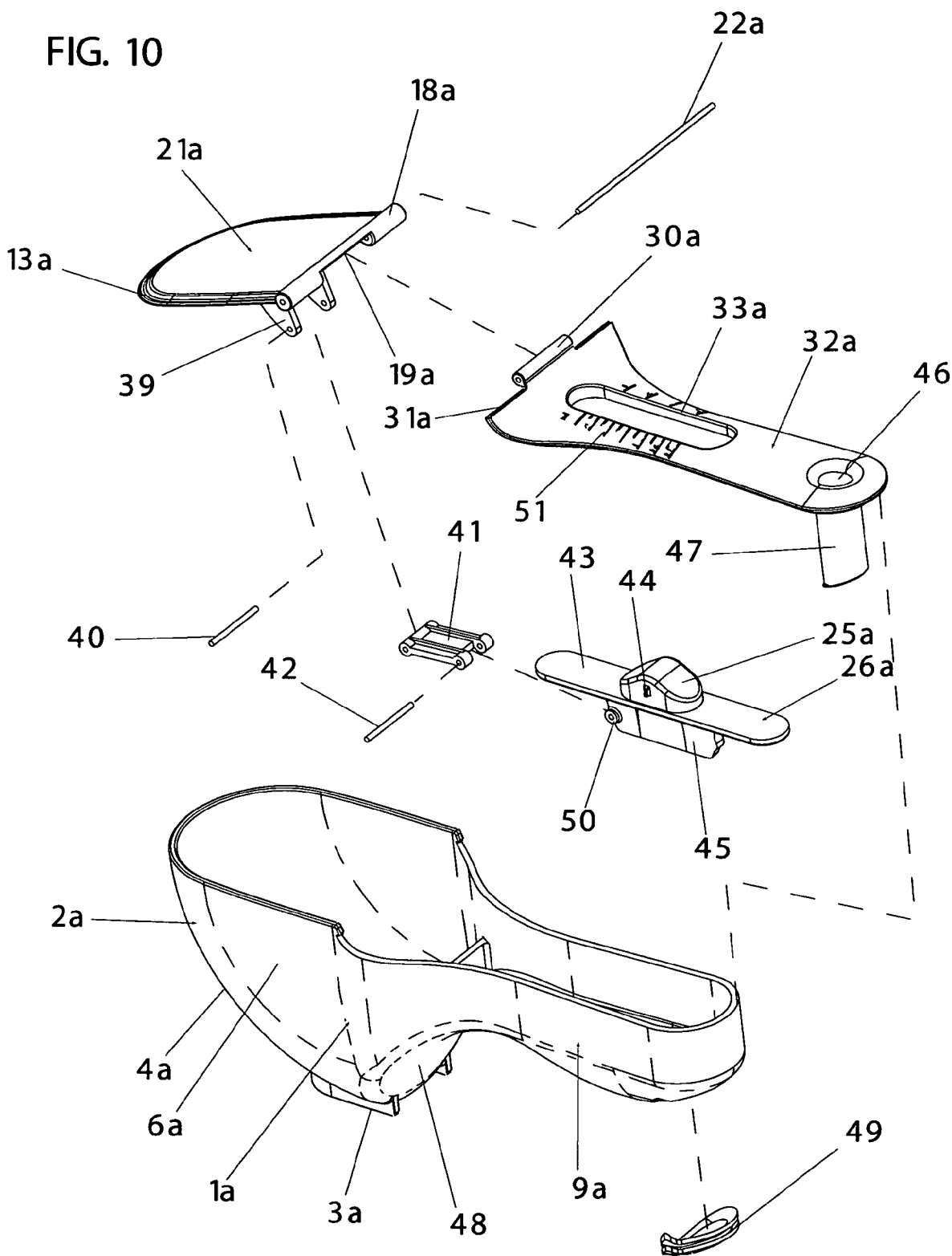
Figure 11:
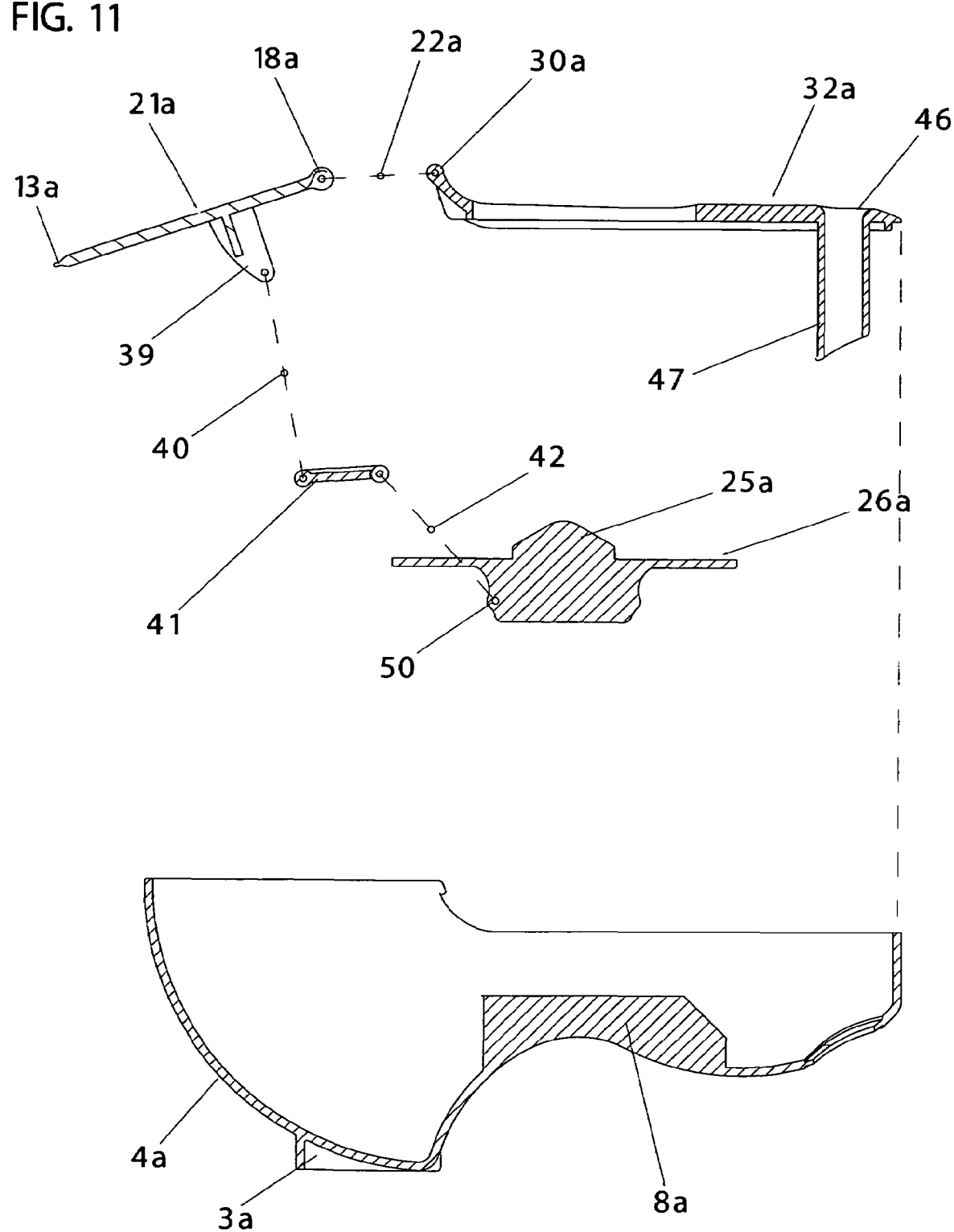
Figure 12:
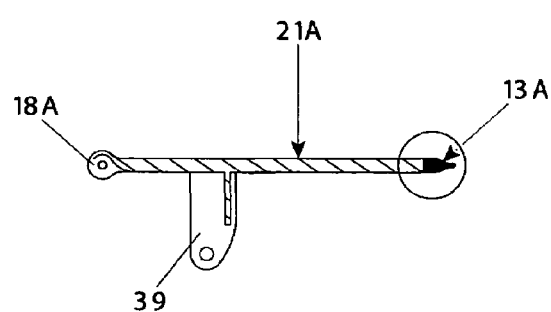
Figure 13:
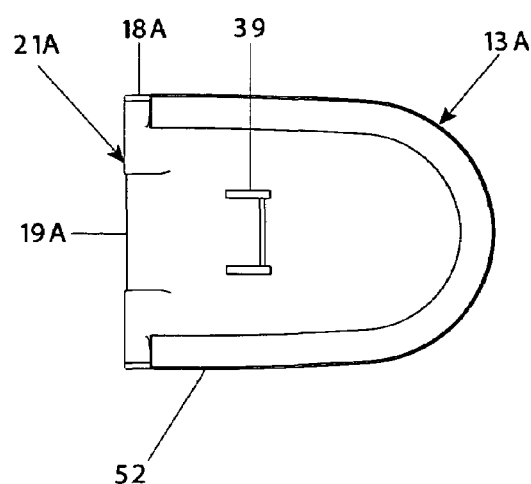
Figure 14:
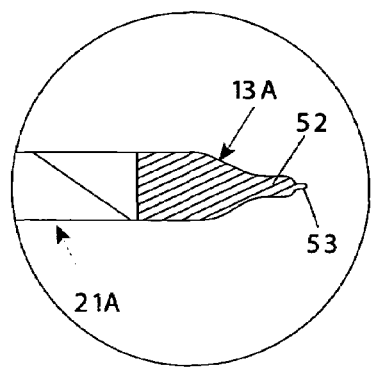
Figure 15:
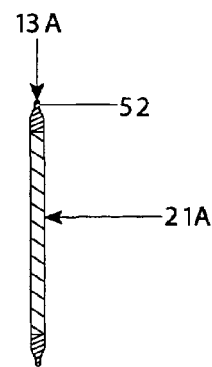
Figure 16:
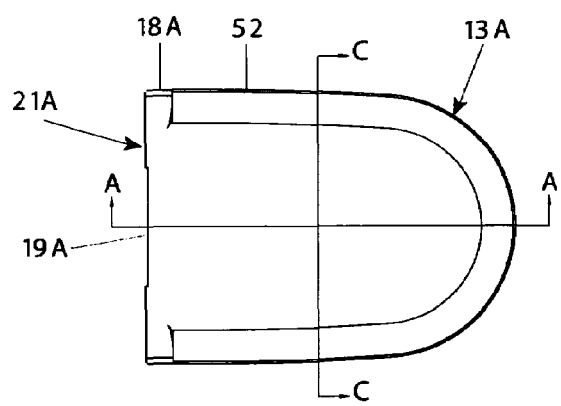

A second preferred embodiment of an adjustable measuring scoop according to the invention is shown in FIGS. 7-16. Scoop 1A is likewise a utensil preferably used for measurement of quantities of materials such as cooking ingredients or any other suitable items. Its capacity is adjustable to allow measurement of a range of quantities of materials, and it is preferably made predominantly of molded plastic. Scoop 1A generally comprises a bucket 2A, an ergonomically shaped handle 9A, and a movable partition 21A. The walls of the bucket 2A comprise a front/bottom portion 4A and side portions 6A, with pedestals 3A provided at the bottom of front/bottom portion 4A to permit the scoop to be rested on a suitable flat surface. The handle 9A also includes a back wall 48, and the movable partition 21A with a lip 13A along its perimeter that snugly and relatively hermetically contacts the interior of the walls of bucket 2A. The handle 9A may also include a cylindrical insert 47 with a passage 46 defined through it (such as for the attachment of a lanyard) and one or more fittings such as a metallic bezel 49.

The movable partition 21A is rotatably connected to a handle insert 32A on an axle 22A (preferably made of a suitable metal) within partition axle boxes 18A (which rest on abutments 31A of handle insert 32A) and a body axle box 30A (which fits within the space 19A between the partition axle boxes). A slide 26A is linearly slidingly secured between handle insert 32A and the body of the handle 9A, and is restricted to a linear path therein similar to the description above of the embodiment of FIGS. 1-6, including by bottom supports 8A within which the runner 45 of slide 26A is laterally confined. The handle insert 32A is secured in place (by snap-locks, glue, or other suitable means), and may include printed and/or embossed metric and/or imperial measuring markings 51. The trigger 25A of slide 26A may also include one or more (e.g., raised and pointed) measuring indicators 44 so that a user can readily reference the pertinent position on the markings 51. The bucket 2A may also have reference indicia (not shown).

As in the embodiment of FIGS. 1-6, the slide 26A slides in response to a force applied forward or backward by a user's finger (preferably thumb) on the portion of trigger 25A protruding through aperture 33A. Forward movement of the slide 26A (which includes axle box 50) moves forward the connector rear axle 42, which in turn moves forward connector 41 to which it is attached, which in turn moves forward connector forward axle 40 (which is attached to the connector 41 and to extensions 39 of partition 21A), which in turn moves forward the extensions 39 of partition 21A, causing partition 21A to pivot forward on axle 22A and swing upwardly toward the opening of the bucket 2A. Backward movement of the slide 26A causes the reverse of these movements. These movements may optionally be facilitated by fitting bushings where one or more axles (e.g., 40 and 42) make moving contact. Also, the parts may be configured and dimensioned so that the forward tab 43 of slide 26A contacts the rear of partition 21A throughout some portion of the partition's range of motion so as to provide an additional point of support for the partition throughout that portion of range of motion.

To facilitate a reliable snug and relatively hermetic sliding fit between the lip 13A of the movable partition 21A and the complementary interior surface of the fixed walls of the bucket 2A as the partition rotates back and forth on axle 22A, the scoop is preferably predominantly formed of a durable and high-strength material that (except for the material for lip 13A) will not deform under normal operating temperatures and conditions. The lip 13A is preferably formed of a compatible, relatively pliable but durable material, and the parts may also preferably be configured and chosen of materials such that there is a frictional fit between lip 13A and bucket 2A that is at least snug enough to prevent unintended movement of partition 21A in response to nominally small forces on trigger 25A and/or directly on partition 21A. The materials and configuration may in fact be selected so as to provide adequate snugness and hermeticity for the containment of liquids, fine powders, etc. As can be seen more closely in FIGS. 12-16, such a moving hermetic seal between lip 13A and the facing interior surface (which is preferably molded with a highly smooth surface) of bucket 2A may preferably be enhanced by providing lip 13A with a flange 52 that is relatively thin (e.g., 0.70 mm thick, as compared to 2.8 mm for the thicker section of lip 13A, on a partition 21A that is approximately 51.85 mm wide) so as to result in a moderate degree of flexing during movement of the partition 21A, and with the flange 52 including a seal 53 (visible only in FIG. 14) that is thinner still (e.g., 0.30 mm thick) so as to result in a more significant degree of flexing during movement of the partition 21A. It has been found that a beneficial balance of manufacturing cost and product performance is obtained by molding the scoop 1A (except for the lip 13A) of acrylonitrile butadiene styrene ("ABS"; a preferable example being Basell® 332 KPP manufactured by Polymirae Co. of South Korea), and co-molding the lip 13A onto the ABS partition 21A from a styrene-ethylene-butadiene-styrene thermoplastic elastomer manufactured by API (Applicazioni Plastiche Industriali), SpA (via Dante Alighieri, 27-36065 Mussolente (Vicenza) Italy) and sold under the trade name Megol/CUG® (50 shore hardness A). An injection speed of 60%, pressure of 35%, and temperature of 210° C. have been found suitable for the co-molding. Alternately, lip 13A could be made of a suitable Santoprene® or Monprene®.

Figure 17:
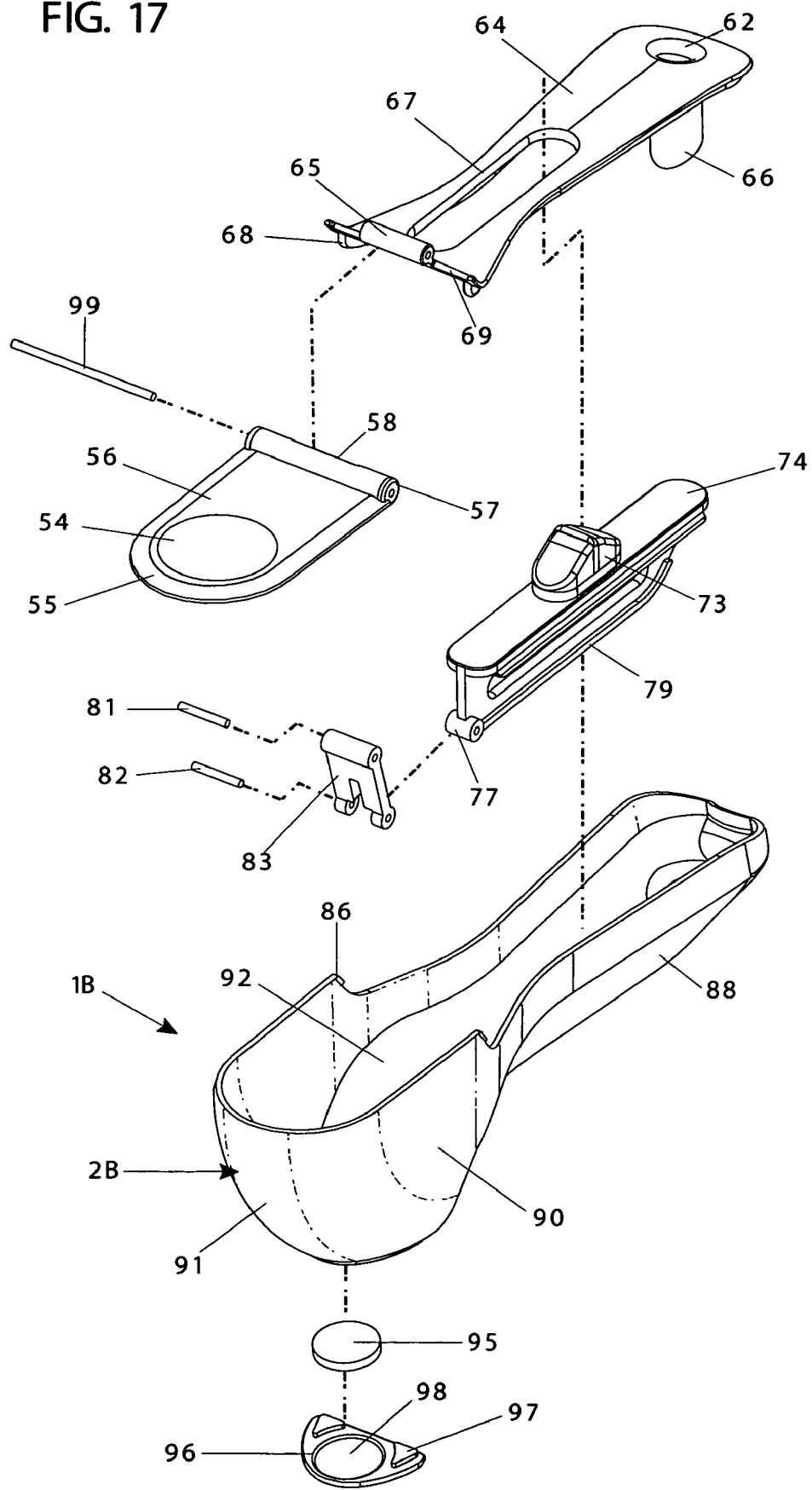
Figure 23:
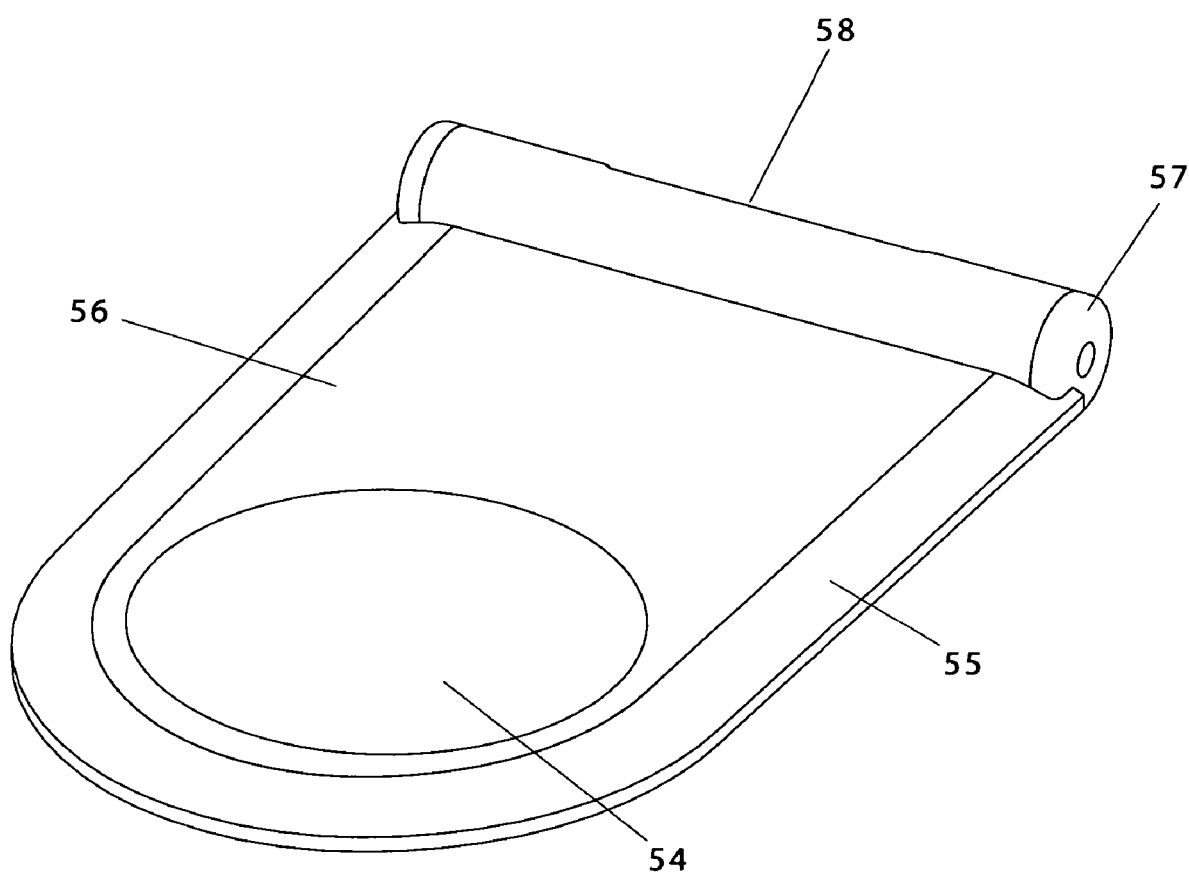

A third preferred embodiment of an adjustable measuring scoop according to the invention is shown in FIGS. 17-23. This scoop operates similarly to the second preferred embodiment just described but is preferably smaller. Scoop 1B generally comprises a bucket 2B, an ergonomically shaped handle 88, and a movable partition 56. The walls of the bucket 2B comprise a front/bottom portion 91 and side portions 90, with a pedestal 96 locked into the scoop with snap-locks 97 and with a magnet 95 inserted in aperture 98 of the pedestal 96 to permit the scoop to be removably adhered to a suitable metallic surface such as a refrigerator door. The handle 88 also includes a back wall 92, and the movable partition 56 with a (preferably co-molded) lip 55 along its perimeter that snugly and relatively hermetically contacts the interior of the walls of bucket 2B. The handle 88 may also include a cylindrical insert 66 with a passage 62 defined through it (such as for the attachment of a lanyard). The movable partition 56 is rotatably connected to a handle insert 64 (which is preferably secured to the handle 88 with the aid of snap-locks 68 and 86) on an axle 99 (preferably made of a suitable metal) within partition axle boxes 58 (which rest on abutments 69 of handle insert 64) and a body axle box 65 (which fits within the space 57 between the partition axle boxes). A slide 74 is linearly slidingly secured between handle insert 64 and the body of the handle 88, and is restricted to a linear path therein similarly as described above, including by a runner 79. The handle insert 64, the trigger 73 of slide 74, and/or bucket 2B may include one or more measuring indicators (not shown).

As in the foregoing embodiments, the slide 74 slides in response to a force applied forward or backward by a user's finger (preferably thumb) on the portion of trigger 73 protruding through aperture 67. Forward movement of the slide 74 (which includes axle box 77) moves forward the connector rear axle 82, which in turn moves forward connector 83 to which it is attached, which in turn moves forward connector forward axle 81 (which is attached to the connector 83 and to extensions 59 of partition 56), which in turn moves forward the extensions 59 of partition 56, causing partition 56 to pivot forward on axle 99 and swing upwardly toward the opening of the bucket 2B. Backward movement of the slide 74 causes the reverse of these movements. These movements may optionally be facilitated by fitting bushings where one or more axles (e.g., 81 and 82) make moving contact. To facilitate a reliable snug and relatively hermetic sliding fit between the lip 55 of the movable partition 56 and the complementary interior surface of the fixed walls of the bucket 2B as the partition rotates back and forth on axle 99, the scoop 1B is preferably formed of materials as described above regarding the second embodiment and the lip 55 may include a similar flange and/or seal. An additional feature of this preferably smaller third embodiment is the depression 54 formed into the movable partition 56. The depression 54 can be used for the convenient temporary holding of small amounts of materials, such as powders, grains, chopped items, liquids, etc.

Figure 24:
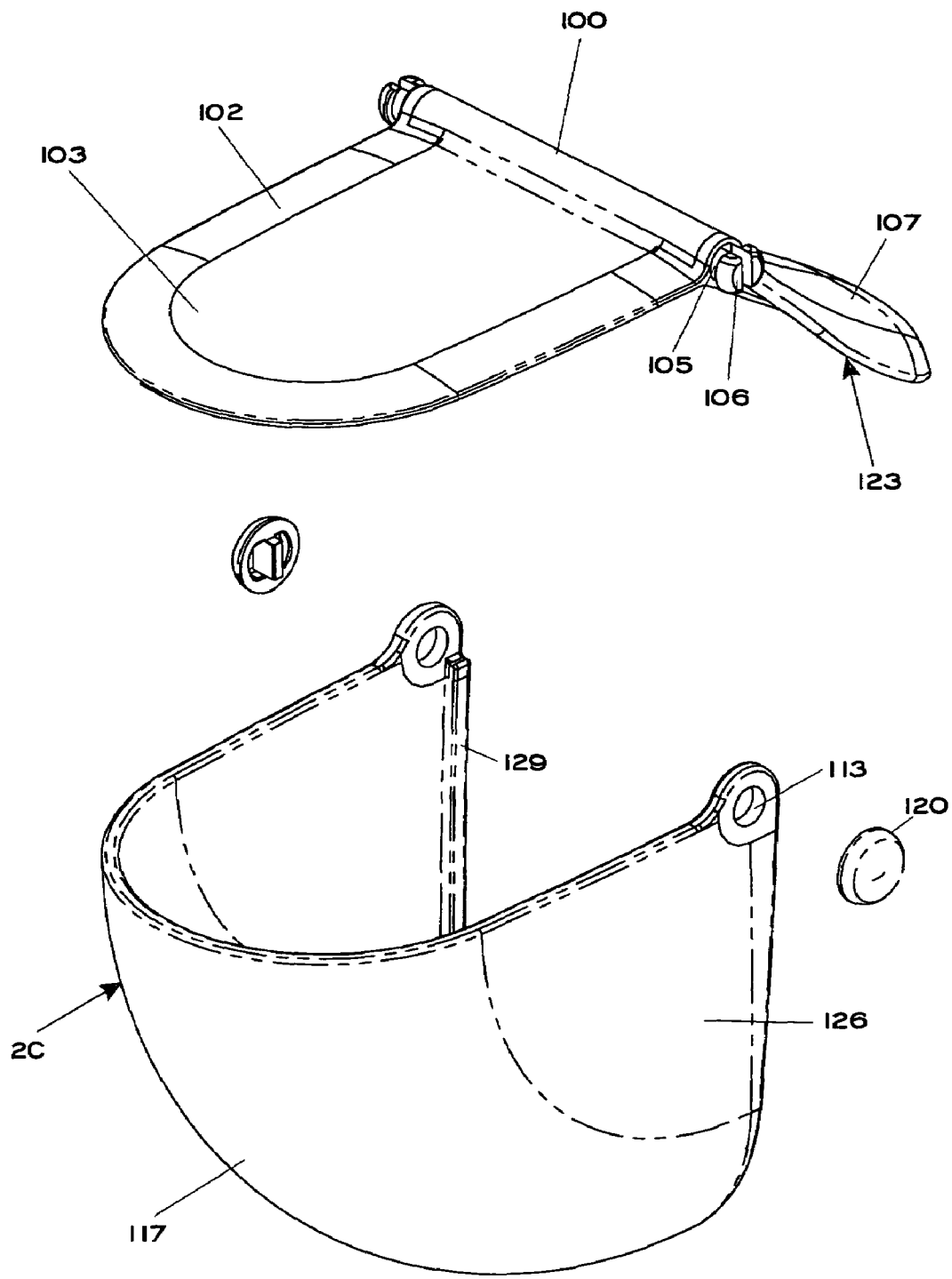
Figure 25:
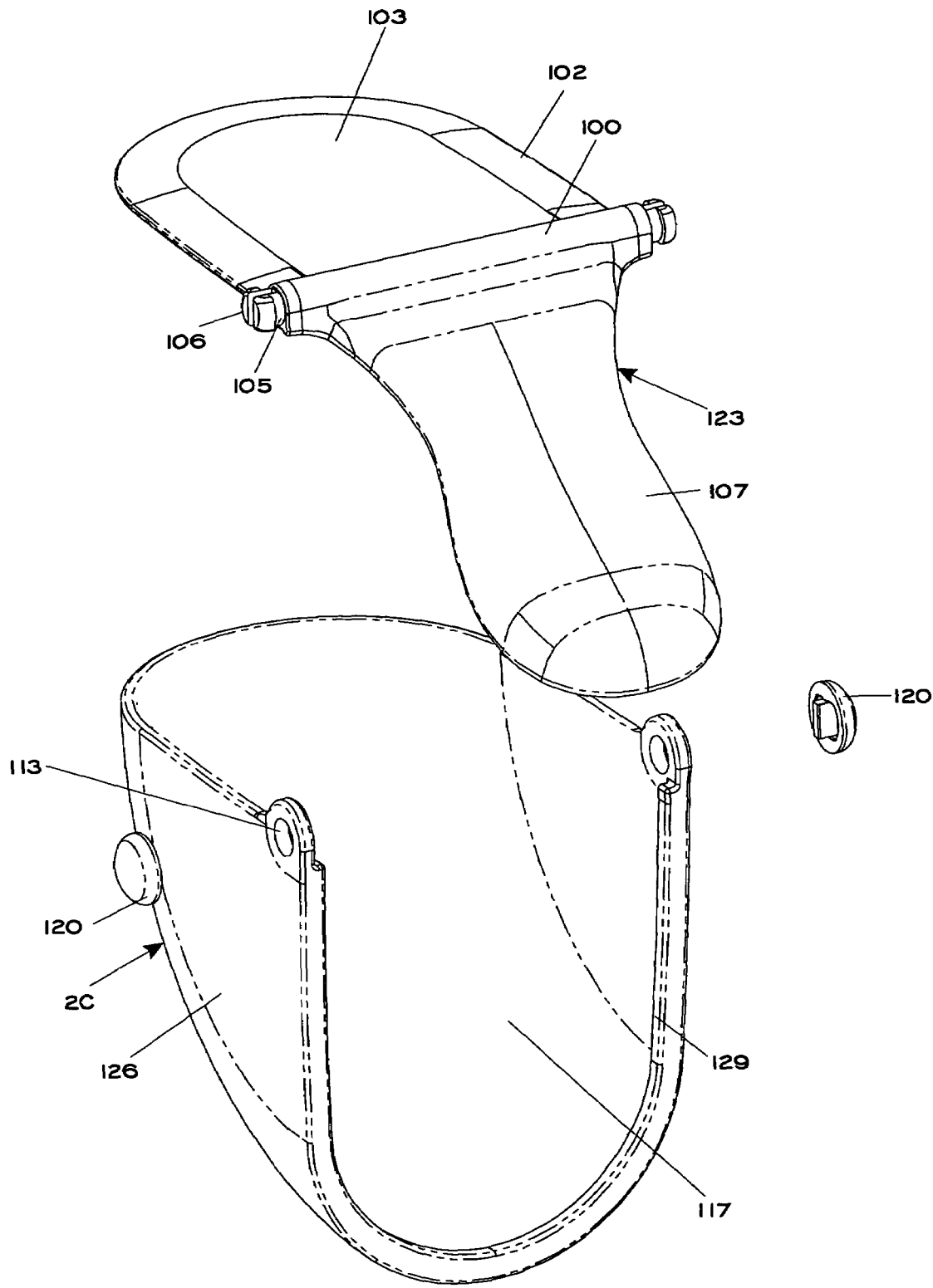
Figure 26:
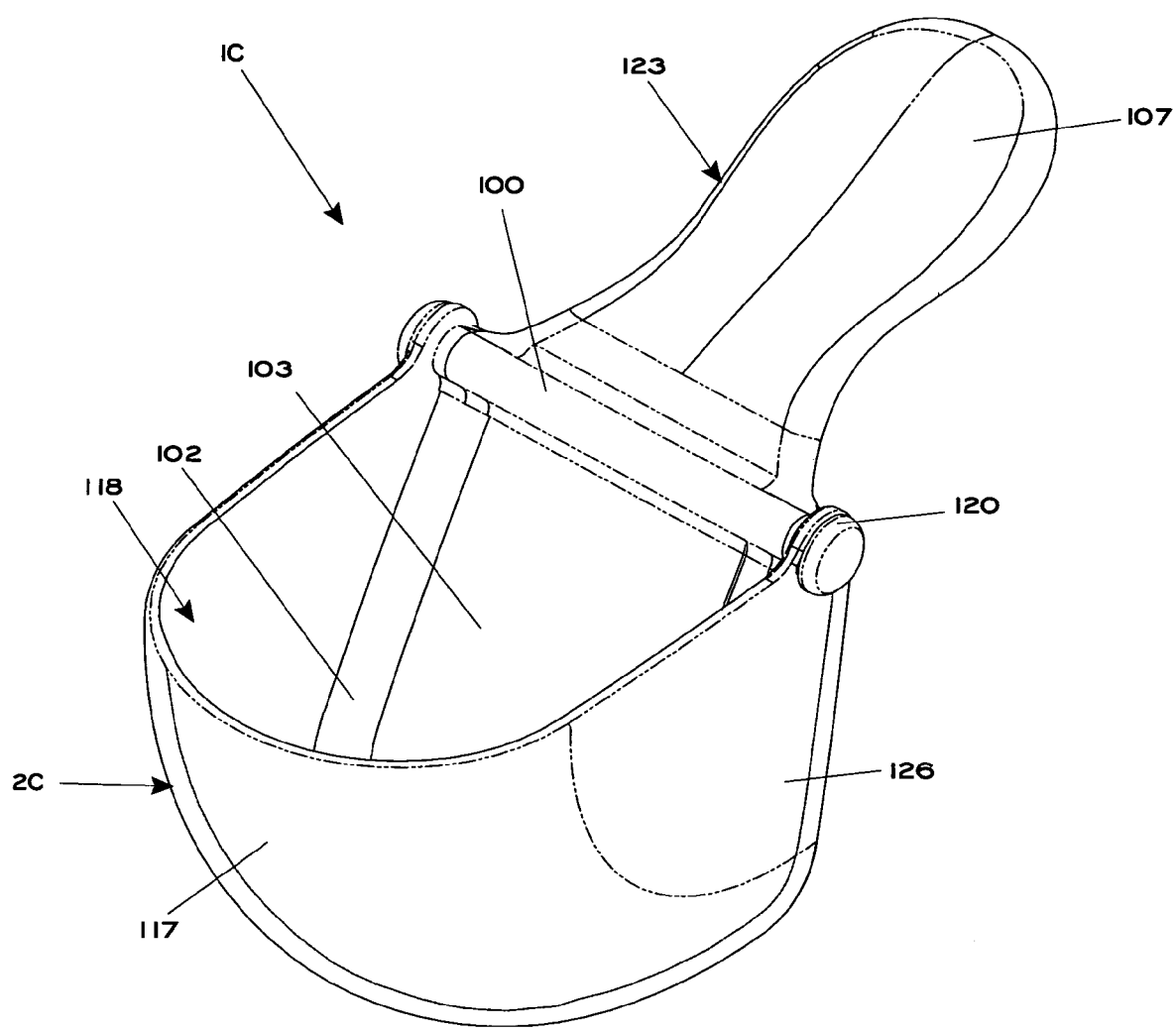
Figure 27:
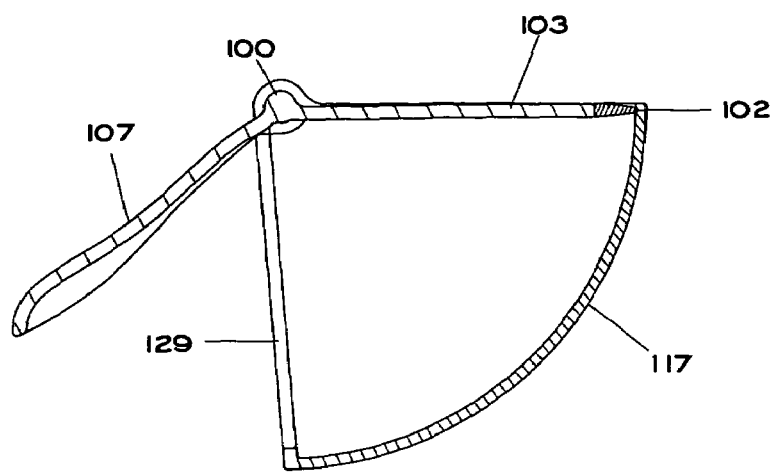
Figure 28:
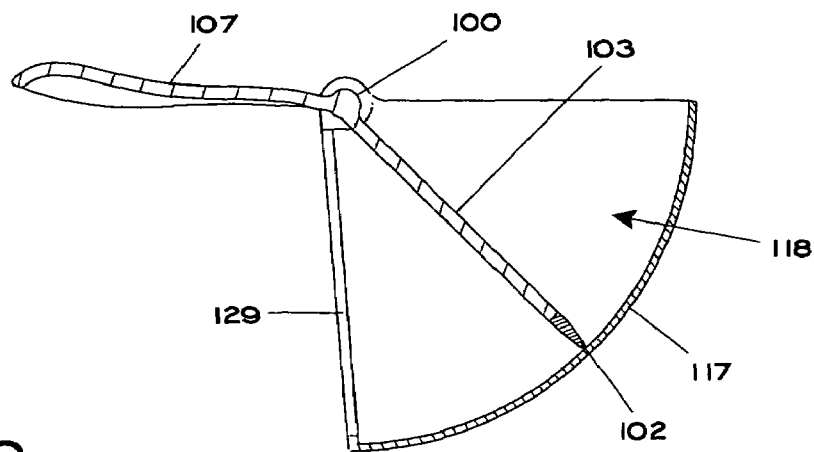
Figure 29:
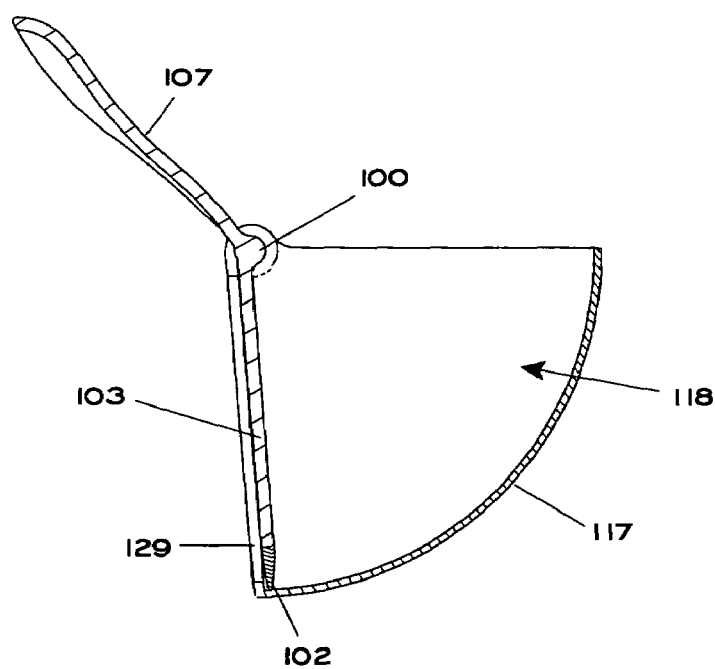

A fourth preferred embodiment of an adjustable measuring scoop 1C according to the invention is shown in FIGS. 24-29. This scoop operates somewhat differently than the previously described embodiments, and omits the slide mechanism. Rather than having a movable partition that is operably connected to a handle, this scoop has an integral partition/handle 123 that is one structurally integral piece. Thus, as shown best in FIGS. 27-29, the integral partition/handle 123 and bucket 2C move with respect to each other in order to vary the effective size of the container region 118 of bucket 2C. This is preferably accomplished by the user simultaneously grasping (preferably with one hand for each respective part) the handle 107 of the integral partition/handle 123 and the sides 126 (and/or front 117) of the bucket 2C and rotating them with respect to each other at posts 105 and eyelets 113. (Each post 105 protruding from the respective end of rib 100 is preferably molded as an integral part of the partition/handle 123. Each post 105 has an outer diameter slightly less than the inner diameter of eyelets 113, and each terminates in a bifurcated head 106 that protrudes out through the respective eyelet 113 and has an outer diameter somewhat greater than the inner diameter of eyelets 113. Each bifurcated head 106 is squeezed together during assembly allowing it to be pressed through eyelets 113, and then each is covered by a mating insert cap 120 so as to obstruct it from being squeezed together again and also to provide a smooth outer surface). The rear end of bucket 2C is formed with a peripheral abutment 129 to prevent such rotation from causing the partition 103 of integral partition/handle 123 to proceed beyond the rear end of bucket 2C, thus preventing contents contained within the container region 118 from escaping downwardly from the bucket 2C. To facilitate a reliable snug and relatively hermetic sliding fit between the partition 103 and the complementary interior surface of the bucket 2C as the integral partition/handle 123 rotates back and forth on posts 105, the scoop 1C is preferably formed of materials as described above regarding the second embodiment and the partition 103 preferably includes a (preferably co-molded) lip 102, which may in turn include a similar flange and/or seal.

Preferred embodiments of an adjustable measuring scoop have thus been disclosed. It will be apparent, however, that various changes may be made in the form, construction, and arrangement of the parts without departing from the spirit and scope of the invention, the form hereinbefore described being merely a preferred or exemplary embodiment thereof. Therefore, the invention is not to be restricted or limited except in accordance with the following claims.

What is claimed is:

1. An adjustable measuring scoop comprising:
   a) a bucket including an opening and a fixed wall having an interior surface and defining an interior space;
   b) a movable partition disposed within said interior space and having an outer perimeter that is in contact with said interior surface, said movable partition connected to said fixed wall by a rotating means and having a range of motion with respect to said fixed wall, said movable partition including a lip, wherein said lip includes a flexible flange having an interior region and a distal region, and wherein said flexible flange includes a seal at said distal region; and,
   c) a handle extending away from said movable partition and formed as a unitary element with said movable partition; wherein said adjustable measuring scoop does not include a handle immovably attached to said fixed wall of said bucket, and wherein the scoop except for the material for said lip is formed of a durable and high-strength material that will not deform under normal operating temperatures and conditions, and wherein said lip is formed of a material that is relatively pliable but durable and that is compatible with the material of the rest of said scoop.

2. The adjustable measuring scoop of claim 1, wherein said flange is thinner than the rest of said lip and said seal is thinner than the rest of said flange.

3. The adjustable measuring scoop of claim 2, wherein said lip is co-molded with said movable partition.

4. The adjustable measuring scoop of claim 2, wherein said rotating means is positioned such that said movable partition is movable toward and away from said opening of said bucket.

5. The adjustable measuring scoop of claim 2, further comprising means for temporarily securing the position of said movable partition once a desired scoop size has been selected, wherein said means for temporarily securing includes intimate, frictional contact of said lip with said interior surface, and wherein said measuring scoop is configured and formed of suitable materials so as to permit for the containment of liquids.

6. The adjustable measuring scoop of claim 1, wherein said measuring scoop is configured and formed of suitable materials so as to permit for the containment of liquids.

7. The adjustable measuring scoop of claim 1, wherein said lip is co-molded with said movable partition.

8. The adjustable measuring scoop of claim 1, wherein said rotating means is positioned such that said movable partition is movable toward and away from said opening of said bucket.

9. The adjustable measuring, scoop of claim 1, further comprising means for temporarily securing the position of said movable partition once a desired scoop size has been selected, wherein said means for temporarily securing includes intimate, frictional contact of said lip with said interior surface.

10. An adjustable measuring scoop comprising:
a) a bucket including an opening, and a fixed wall having an interior surface and defining an interior space;
b) a movable partition disposed within said interior space and having an outer perimeter that is in contact with said interior surface, said movable partition connected to said fixed wall by a rotating means and having a range of motion with respect to said fixed wall, said movable partition including a lip;
c) a handle extending away from said movable partition and formed as a unitary element with said movable partition; and
d) means for temporarily securing the position of said movable partition once a desired scoop size has been selected, wherein said means for temporarily securing includes intimate, frictional contact of said lip with said interior surface, wherein said adjustable measuring scoop does not include a handle immovably attached to said fixed wall of said bucket, and wherein the scoop except for the material for said lip is formed of a durable and high-strength material that will not deform under normal operating temperatures and conditions, and wherein said lip is formed of a material that is relatively pliable but durable and that is compatible with the material of the rest of said scoop.

11. The adjustable measuring scoop claim 10, wherein said lip includes a flexible flange having an interior region and a distal region.

12. The adjustable measuring scoop of claim 11, wherein said flexible flange includes a seal at said distal region.

13. The adjustable measuring scoop of claim 12, wherein said flange is thinner than the rest of said lip and said seal is thinner than the rest of said flange.

14. The adjustable measuring scoop of claim 13, wherein said lip is co-molded with said movable partition.

15. The adjustable measuring scoop of claim 13, wherein said rotating means is positioned such that said movable partition is movable toward and away from said opening of said bucket.

16. The adjustable measuring scoop of claim 15, wherein said measuring scoop is configured and formed of suitable materials so as to permit for the containment, of liquids.

17. The adjustable measuring scoop of claim 12, wherein said measuring scoop is configured and formed of suitable materials so as to permit for the containment of liquids.

18. The adjustable measuring scoop of claim 11, wherein said lip is co-molded with said movable partition.

19. The adjustable measuring scoop of claim 10, wherein said lip is co-molded with said movable partition.

20. The adjustable measuring scoop of claim 10, wherein said rotating means is positioned such that said movable, partition is movable toward and away from said opening of said bucket.

* * * * *